US006475453B1

(12) United States Patent
Mathes et al.

(10) Patent No.: US 6,475,453 B1
(45) Date of Patent: Nov. 5, 2002

(54) CONFIGURATION FOR DECOMPOSING NITROGEN OXIDES IN A GAS STREAM AND METHOD FOR USING THE CONFIGURATION

(75) Inventors: Wieland Mathes, Michelau; Lothar Hofmann, Altenkunstadt; Frank Witzel, Lichtenfels, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/133,004

(22) Filed: Aug. 12, 1998

Related U.S. Application Data

(63) Continuation of application No. PCT/DE97/00210, filed on Feb. 3, 1997.

(30) Foreign Application Priority Data

Feb. 12, 1996 (DE) .......................... 196 05 115

(51) Int. Cl.[7] .................... B01J 21/04; B01J 23/16; B01J 35/02; C01B 21/00; B01D 50/00
(52) U.S. Cl. .................. 423/239.1; 422/169; 422/170; 422/180; 422/222; 423/212; 502/439; 502/353; 502/527.19
(58) Field of Search .................. 502/439, 353, 502/527.19; 422/169, 222, 177, 180; 423/239.1, 212

(56) References Cited

U.S. PATENT DOCUMENTS

| 3,785,781 A | | 1/1974 | Hervert et al. ............... 23/288 |
|---|---|---|---|
| 4,118,199 A | | 10/1978 | Völker et al. ............... 422/171 |
| 4,987,112 A | * | 1/1991 | Engler et al. ............... 502/255 |
| 5,108,716 A | | 4/1992 | Nishizawa ............... 422/171 |
| 5,397,545 A | * | 3/1995 | Balling et al. ............... 422/171 |
| 5,538,697 A | * | 7/1996 | Abe et al. ............... 422/171 |

FOREIGN PATENT DOCUMENTS

| DE | 9012384.0 | | 10/1990 | |
|---|---|---|---|---|
| DE | 4024942 A1 | | 2/1992 | |
| DE | 4027329 A1 | | 3/1992 | |
| EP | 0611594 A1 | | 8/1994 | |
| JP | 56-50716 | * | 9/1979 | ............ F01N/3/28 |
| WO | 92/02716 | | 2/1992 | |

OTHER PUBLICATIONS

English language translation of Janpanese 56–50716 (May 1981).*
Japanese Patent Abstract No. 61163950 (Toshiaki), dated Jan. 26, 1988.
Japanese Patent Abstract No. 62161065 (Nishizawa), dated Jan. 11, 1989.

* cited by examiner

Primary Examiner—Wayne A. Langel
Assistant Examiner—Jonas N. Strickland
(74) Attorney, Agent, or Firm—Laurence A. Greenberg; Werner H. Stemer; Ralph E. Locher

(57) ABSTRACT

A configuration for decomposing nitrogen oxides in a gas stream includes a plurality of catalytic converters disposed one after the other through which the gas stream can flow. Each of the catalytic converters has a honeycomb structure with many parallel cells through which the gas stream can flow. Each of the catalytic converters also has a predetermined cell density and a predetermined average level of activity defined as a proportion by weight of the catalytically active agent. The predetermined cell density of a second catalytic converter through which the gas stream flows after a first catalytic converter is lower than the predetermined cell density of the first catalytic converter. The predetermined average level of activity of the second catalytic converter is also higher than the predetermined average level of activity of the first catalytic converter. The configuration is preferably used in conjunction with an exhaust gas from a combustion drive unit.

12 Claims, 3 Drawing Sheets

CONFIGURATION FOR DECOMPOSING NITROGEN OXIDES IN A GAS STREAM AND METHOD FOR USING THE CONFIGURATION

CROSS-REFERENCE TO A RELATED APPLICATION

This is a continuation of International Application PCT/DE97/00210, filed on Feb. 3, 1997, which designated the United States.

BACKGROUND OF THE INVENTION

Field of the Invention

The invention relates to a configuration for decomposing nitrogen oxides in a gas stream which includes a plurality of catalytic converters disposed one after the other through which the gas can flow. Each of the catalytic converters has a honeycomb structure with many parallel cells through which the gas stream can flow and which are present at a particular cell density. Each of the catalytic converters also has an average level of activity defined as the proportion by weight of the catalytically active agent in the catalytic converter. A configuration of this type is disclosed in Published European Patent Application EP 0 611 594 A1, Published, Non-Prosecuted German Patent Application DE 40 27 329 A1, U.S. Pat. No. 4,118,199 or German Utility Model DE 90 12 384 U1.

A configuration of this type includes, in particular, catalytic converters which decompose nitrogen oxides by a selective catalytic reduction (SCR) process. For which purpose a suitable reducing agent must be added to the gas stream. Ammonia is preferably used as the reducing agent. In order to add ammonia to the gas stream, either ammonia itself, or a compound which readily decomposes and releases ammonia, in particular, urea can be distributed in the gas stream.

A configuration of this type is preferably a component of an exhaust gas system of a combustion drive unit, for example a diesel engine or a gas turbine, and the gas stream is an exhaust gas given off by the combustion drive unit. In principle, the configuration is used on any combustion drive unit which gives off an exhaust gas which still includes oxygen. It can thus also be a petrol or gas engine which is operated with excess air.

From the prior art publications cited in the introduction, it follows that the catalytic converters through which the gas stream flows one after the other are furnished with different chemical properties, see, in particular, Published European Patent Application EP 0 611 594 A1, U.S. Pat. No. 4,118,199 and Published, Non-Prosecuted German Patent Application DE 40 27 329 A1. In particular, a catalytically active substance which is a constituent of the catalytic converter can be provided at increasing concentration along the flow path of the gas stream.

According to the German Utility Model DE 90 12 384 U1, in a corresponding apparatus, catalytic converters having geometries differing from one another are disposed one after the other. These catalytic converters can, in particular, be catalytic converters of the honeycomb type. A catalytic converter of the honeycomb type is characterized in each case by the cell density of the cells through which the gas stream can flow are disposed. In general the cells are connected side by side and in parallel to one another.

SUMMARY OF THE INVENTION

It is accordingly an object of the invention to provide a configuration for decomposing nitrogen oxides in a gas stream and a method for using the configuration which overcome the above-mentioned disadvantages of the prior art devices and methods of this general type, which can be adapted in a particular manner to the relevant parameters of the gas stream for which it is intended and which is distinguished by a particularly high efficiency with a particularly small construction.

With the foregoing and other objects in view there is provided, in accordance with the invention, a configuration for decomposing nitrogen oxides in a gas stream flow, including: a plurality of catalytic converters having a first catalytic converter and a second catalytic converter disposed one behind the other for receiving and conducting the gas stream flow, each of the catalytic converters having a honeycomb structure with a multiplicity of parallel cells through which the gas stream flows, each of the catalytic converters also having a predetermined cell density of the parallel cells and a predetermined average level of activity defined by a percentage of weight of a catalytically active agent in a respective catalytic converter, the predetermined cell density of the second catalytic converter being lower than the predetermined cell density of the first catalytic converter, and the predetermined average level of activity of the second catalytic converter being higher than the predetermined average level of activity of the first catalytic converter.

To achieve the object of the invention, the cell density of the second catalytic converter through which the gas stream can flow downstream of the first catalytic converter is lower than the cell density of the first catalytic converter, and the average level of activity of the second catalytic converter is higher than the average level of activity of the first catalytic converter.

Here, catalytic converters are therefore disposed one after the other which are considerably different from one another both with respect to their chemical composition and also with respect to their geometry. Preferably, catalytic converters are present in a multiplicity, for example four catalytic converters, and the properties mentioned change from catalytic converter to catalytic converter preferably monotonically. This provides additional degrees of freedom for construction of the configuration and makes it possible for the configuration to be adapted considerably better than hitherto to the requirements resulting from given properties of the gas stream.

In particular, it is possible to construct the configuration in such a manner that it is fully active in a broad temperature range, for example from 170° C. to 500° C. For this purpose, the catalytic converters in the configuration can be constructed in such a manner that they develop their respective highest efficiency at respective maximum temperatures which are different from one another. It is also possible to take into account an interaction which arises with respect to the activity between the catalytic converters, in particular, the geometry of the second catalytic converter can take into account specific properties of the gas stream which arise from the fact that it has already flowed through the first catalytic converter. Furthermore, the selectivity of the configuration can be considerably improved in comparison with the prior art with respect to the reactions to be catalyzed by the configuration, since, with appropriate account being taken of the interactions occurring between the catalytic converters. In this manner, any catalytic converter can be optimized to a particularly selectivity with respect to the prevailing conditions.

The conversion of pollutants in the exhaust gas which flows through the configuration of the catalytic converter remains small initially, since the activity of the first catalytic converter is relatively small. This is preferably caused by the catalytic converter having a relatively low content of the catalytically active agent, for example divanadium pentoxide. This certainly makes the catalytic converter highly suitable for reacting pollutants in an exhaust gas which has a relatively high temperature, which, in the case of the first catalytic converter of the configuration, will generally be true. The second catalytic converter has a relatively high activity and is thus highly suitable for removing from the exhaust gas pollutant residues remaining downstream of the first catalytic converter. The relatively high content of the catalytically active agent in the second catalytic converter makes this particularly suitable, especially when the catalytically active agent is divanadium pentoxide, for removing pollutants from exhaust gases having relatively low temperatures, as is generally the case at the second catalytic converter. Generally, it can be expected that the temperature of the exhaust gas decreases during its flow through the configuration. The distribution of activity over the catalytic converters thus particularly complies with the specific properties of the catalytically active agent.

The choice of a comparatively high cell density for the first catalytic converter and of a comparatively low cell density for the second catalytic converter takes into account the distribution of activity over the configuration in a particularly advantageous manner. This is because the choice of a relatively high cell density for the first catalytic converter makes up for low activity of the catalytic converter by the fact that it provides in the first catalytic converter a particularly high surface area on which the reaction to be catalyzed can take place. In this manner, even at a comparatively low activity, a good conversion rate of the pollutants present in the exhaust gas can be achieved. The choice of a high activity for the second catalytic converter, in contrast, permits the choice of a comparatively low cell density and thus of a comparatively low surface area in the second catalytic converter for the reaction to be catalyzed, and thus permits a decrease of the pressure drop in the exhaust gas stream caused by introducing the configuration. The present configuration thus complies in a particularly advantageous manner with the flow conditions and chemical conditions which must be heeded in the removal of pollutants from an exhaust gas stream.

In the context of a preferred development of the configuration, a front most catalytic converter, through which the gas stream can flow first, has a cell density of 200 cpsi to 400 cpsi. A rear most catalytic converter through which the gas stream can flow last has here a cell density of 10 cpsi to 100 cpsi. The unit "cpsi" has established itself as a commonly used unit in the subject, defined as "cells per square inch". The cell density of the front most catalytic converter can be varied independently of the cell density of the rear catalytic converter and can be adapted to the requirements of the particular application. It is just as possible to choose the cell density of the front most catalytic converter at 400 cpsi and the cell density of the rear most catalytic converter at 10 cpsi or to provide the front most catalytic converter with 200 cpsi and the rear catalytic converter with 100 cpsi. In order to put the citation of cell density in proportion to the catalytic converter dimensions used in a concrete application, it may be noted that a conventional catalytic converter, measured in a cross section, has a diameter or a thickness of at least 2 inches or 5 cm. Thus a conventional catalytic converter having a cell density of 10 cpsi possesses a good 100 cells or more.

It is further preferred that every catalytic converter in the configuration includes a ceramic material based on titanium dioxide and/or tungsten trioxide. An especially effective catalytically active agent used in this connection is divanadium pentoxide. The average level of activity, measured by the content of divanadium pentoxide, is preferably between 0% and 5% for the front most catalytic converter and between 15% and 20% for the rear most catalytic converter.

Further preferably, the catalytically active agent is inhomogeneously distributed in every catalytic converter. The concentration of the catalytically active agent in the catalytic converter increasing from the inlet side to the outlet side in the direction of flow determined by the gas stream. With regard to the remark made in the preceding paragraph, in which the catalytically active agent is divanadium pentoxide, its concentration can increase monotonically from 0% to 20% from the front most to the rear most catalytic converter. Possible methods of producing an inhomogeneous concentration of this type are known from the prior art and do not require any further explanation here.

An injection unit for injecting a reducing agent, preferably a urea, into the gas stream upstream of the catalytic converters is preferably assigned to the configuration. As already explained, the configuration can be adapted particularly well to a gas stream which has parameters which vary greatly during operations. Even in this case a particularly compact construction of the configuration is possible. The configuration is thus particularly suitable for use in a mobile unit, for example in a motor vehicle engine. For such an application, in particular, the use of urea as the reducing agent is preferred, since urea, in contrast to pure ammonia, can be provided in the form of a stable and not excessively chemically reactive aqueous solution. The configuration is thus most suitable for applications in which lay persons must occasionally supplement a store of the reducing agent.

With the foregoing and other objects in view there is also provided, in accordance with the invention, a method for decomposing nitrogen oxides in a gas stream flow, which includes: placing a plurality of catalytic converters having a first catalytic converter and a second catalytic converter one behind the other, each of the catalytic converters having a honeycomb structure with a multiplicity of parallel cells, each of the catalytic converters also having a predetermined cell density of the parallel cells and a predetermined average level of activity defined by a percentage of weight of a catalytically active agent in a respective catalytic converter, the predetermined cell density of the second catalytic converter being lower than the predetermined cell density of the first catalytic converter, and the predetermined average level of activity of the second catalytic converter being higher than the predetermined average level of activity of the first catalytic converter; and processing a gas stream discharged as exhaust gas from a combustion drive unit through the plurality of catalytic converters for decomposing nitrogen oxides in the gas stream, the gas stream having a temperature fluctuating between about 170° C. and about 500° C.

According to the invention, the use of the configuration is envisaged for the decomposition of nitrogen oxides in a gas stream which is discharged as exhaust gas from a combustion drive unit, the gas stream having a temperature fluctuating between about 170° C. and about 500° C.

Particularly preferably here, urea, in particular in aqueous solution, is injected into the gas stream upstream of the catalytic converters.

Particular preference is also given to the use of the configuration in which the catalytic converters decompose the nitrogen oxides by a process of selective catalytic reduction.

Other features which are considered as characteristic for the invention are set forth in the appended claims.

Although the invention is illustrated and described herein as embodied in a configuration for decomposing nitrogen oxides in a gas stream and a method for using the configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
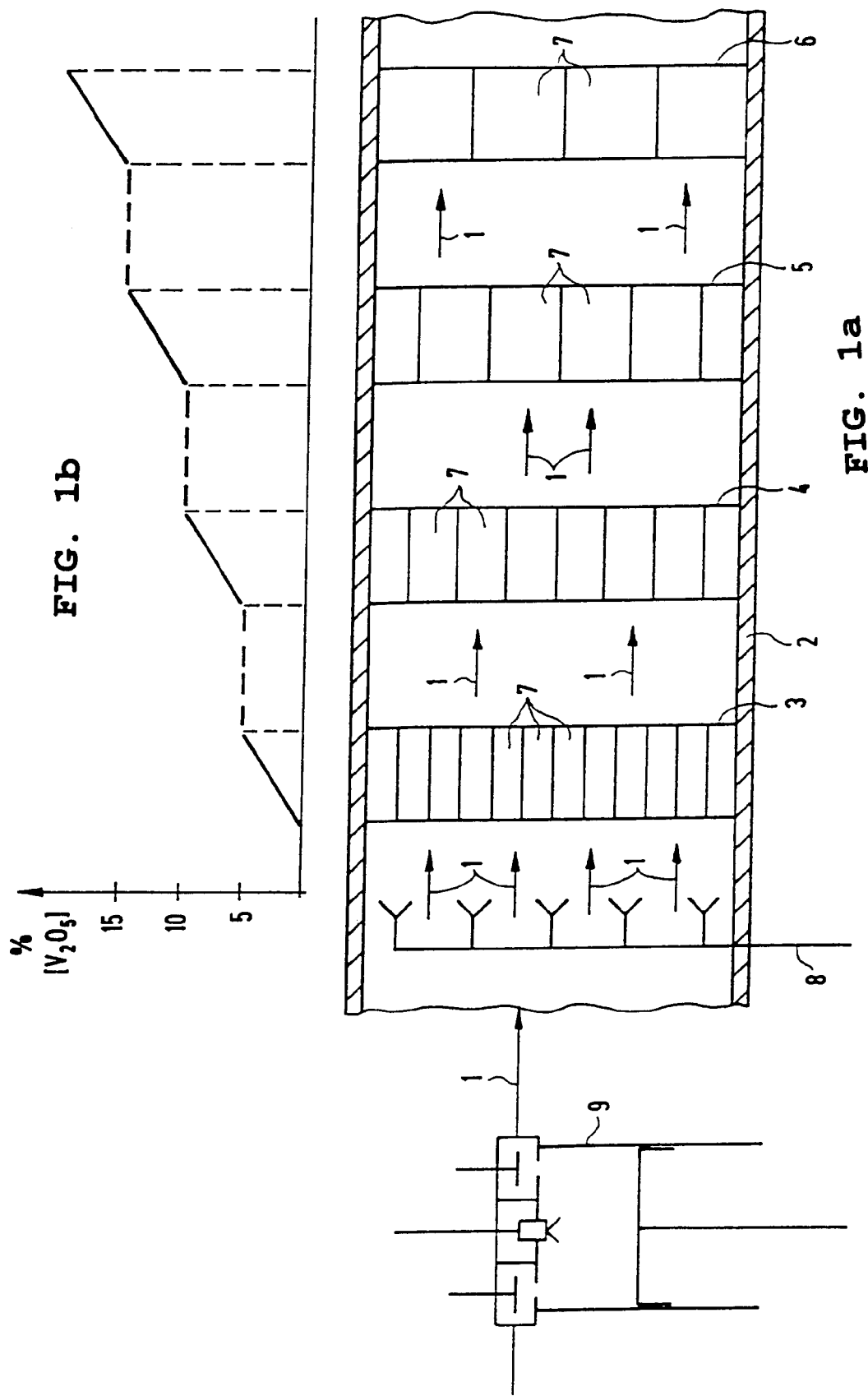
FIG. 1a is a sectional view of a configuration for decomposing nitrogen oxides in a gas stream which is used in conjunction with a combustion drive unit according to the invention.
FIG. 1b is a graph depicting the percentage by weight of a catalyatically active agent in each of a plurality of catalytic converters.

Exemplary embodiments of the invention are described below with reference to the drawing. This is not intended to depict the exemplary embodiment to scale, rather, the drawing where it aids the explanation, is shown in diagrammatic and/or slightly distorted form. With respect to supplementations of the teaching immediately recognizable from the drawing, reference is made to the relevant prior art. Referring now to the figures of the drawing in detail and first, particularly, to FIG. 1a thereof, there is shown a configuration for decomposing nitrogen oxides in a gas stream 1 which flows through a pipe 2 having catalytic converters 3, 4, 5 and 6 disposed one after the other therein at a distance from one another. Each of the catalytic converters 3, 4, 5 and 6 has a honeycomb structure having a multiplicity of parallel cells 7 through which the gas stream 1 can flow. The honeycomb structure defined in this manner is described by a parameter denoted "cell density", which denotes the number of cells 7 per unit area of cross section in the respective catalytic converter 3, 4, 5, 6. The front most (or first) catalytic converter 3 is the catalytic converter present with the highest cell density. The cell density decreases continuously in the middle (or second or third) catalytic converter 4 and 5, which follow the front most catalytic converter 3, to the rear most (or fourth) catalytic converter 6. The decrease in cell density corresponds in the present case to a decrease by a factor of approximately 10, that is, for example, from 200 cpsi to 20 cpsi (cells per square inch). The decrease between adjacent catalytic converters 3, 4, 5, 6 or else from the front most catalytic converter 3 to the rear most catalytic converter 6 must be adapted to the particular requirements in an individual case. Factors between 2 and 40 can be used for the ratio between the highest and lowest cell density.

The catalytic converters 3, 4, 5 and 6 are preferably extruded ceramic bodies. However, they can also be metal supports having corresponding coatings. Extruded bodies, if they are to serve as selective catalytic reduction (SRC) catalysts, are produced from a kneaded composition based on titanium dioxide $TiO_2$ and/or tungsten trioxide $WO_3$. A body of this type preferably includes, as a catalytically active agent, in particular divanadium pentoxide $V_2O_5$, which is incorporated into the kneaded composition or into the body directly during production or after production in the form of an impregnation. The concentration of the active agent in the body need not necessarily be homogeneous. In the exemplary embodiment shown, each of the inhomogeneous catalytic converters 3, 4, 5, 6 has a different average level of activity, defined in each case as the proportion by weight of the catalytically active medium present. This is plotted in FIG. 1b in a diagram which is situated above the pipe 2 and which shows in percentages the concentration of the divanadium pentoxide in each of the catalytic converters 3, 4, 5, 6. The concentration varies between 0% at the inlet side of the front most catalytic converter 3 and 20% at the outlet side of the rear most catalytic converter 6. An inlet side and an outlet side are each defined here by the direction in which the gas stream 1 flows through the catalytic converters 3, 4, 5, 6. In each of the catalytic converters 3, 4, 5, 6, the concentration of the divanadium pentoxide increases in a linear manner from the inlet side to the outlet side. The average levels of activity, defined by the respective averages of the concentrations, are 2.5% for the front most (first) catalytic converter 3, 7.5% for the (second) catalytic converter 4 following this, 12.5% for the next (third) catalytic converter 5 and finally 17.5% for the rear most (fourth) catalytic converter 6. The values are determined for each individual case and must be adapted to the conditions under which the apparatus is to be operated each time.

In the exemplary embodiment of FIG. 1a, the catalytic converters 3, 4, 5 and 6 operate according to the principle of selective catalytic reduction, catalyzing a reaction between the nitrogen oxides and a separately supplied reducing agent. The reducing agent is generally ammonia, which is added directly or is produced by hydrolyzing a compound such as urea in the gas stream 1. To add the reducing agent, according to FIG. 1a an injection unit 8 is provided. The injection unit 8 injects the gas stream 1 with an aqueous solution of urea, which is hydrolyzed at the temperatures prevailing in gas stream 1 and releases ammonia.

The complete apparatus is assigned to a combustion drive unit 9, shown by way of example as a diesel engine. The combustion drive unit 9 discharges exhaust gases which are laden with nitrogen oxides. In the apparatus having the catalytic converters 3, 4, 5, 6, the nitrogen oxides are decomposed by selective catalytic reduction.

Figure 2:
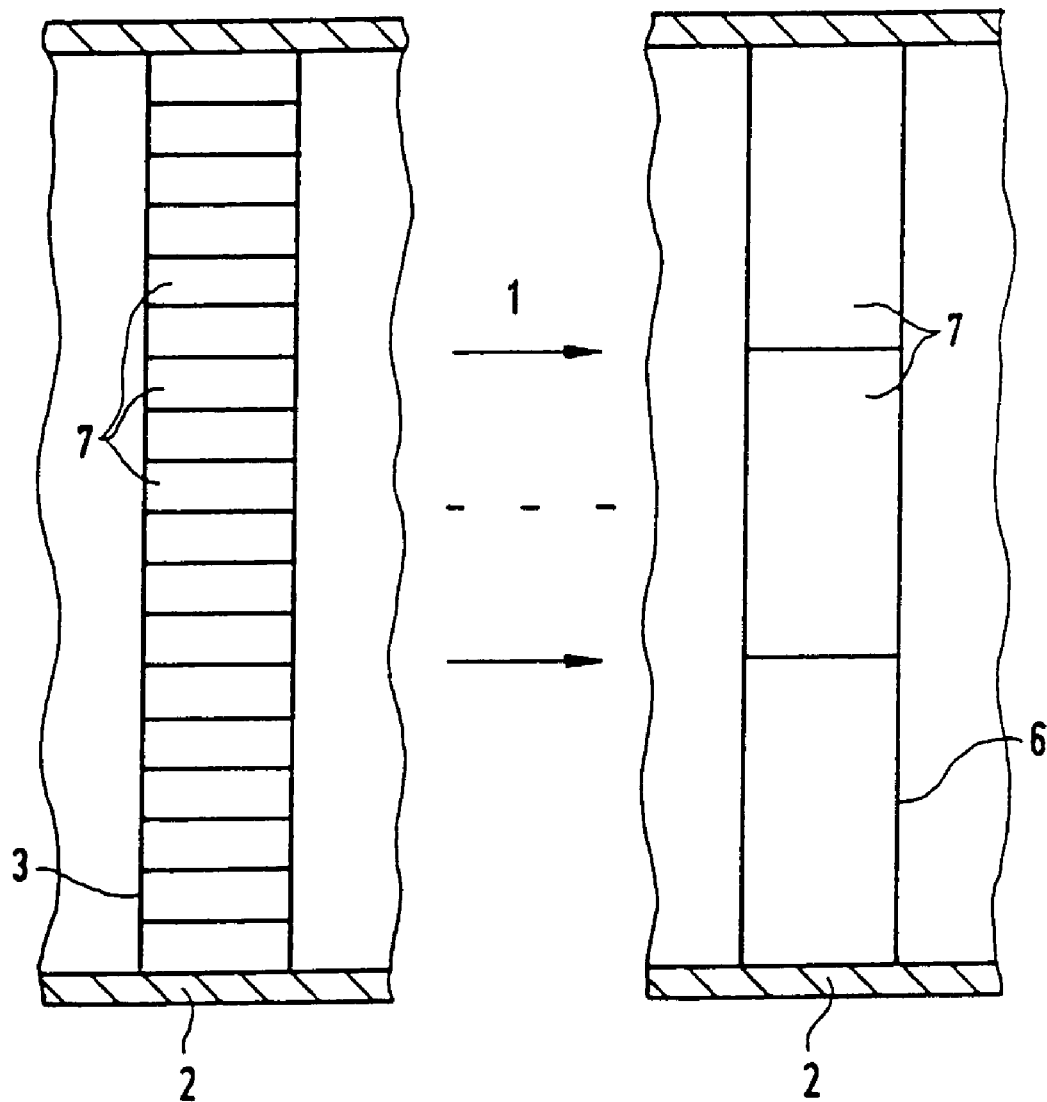
FIG. 2 is a fragmentary, sectional view of a differently dimensioned exemplary embodiment.

FIG. 2 demonstrates the freedom in construction of the front most catalytic converter 3 and the rear most catalytic converter 6 in the pipe 2. In the example shown, the cell density of the front most catalytic converter 3 is about 40 times as high as the cell density of the rear most catalytic converter 6. Attention must once again be drawn to the fact that the drawing is not a scale drawing of a concrete exemplary embodiment. According to FIG. 2, the rear most catalytic converter 6 has only a few of the cells 7, which benefits the clarity of the figure, but does not necessarily conform with reality. Even at a cell density of only 10 cpsi, the catalytic converter would in reality still have at least about 40 cells 7.

Figure 3:
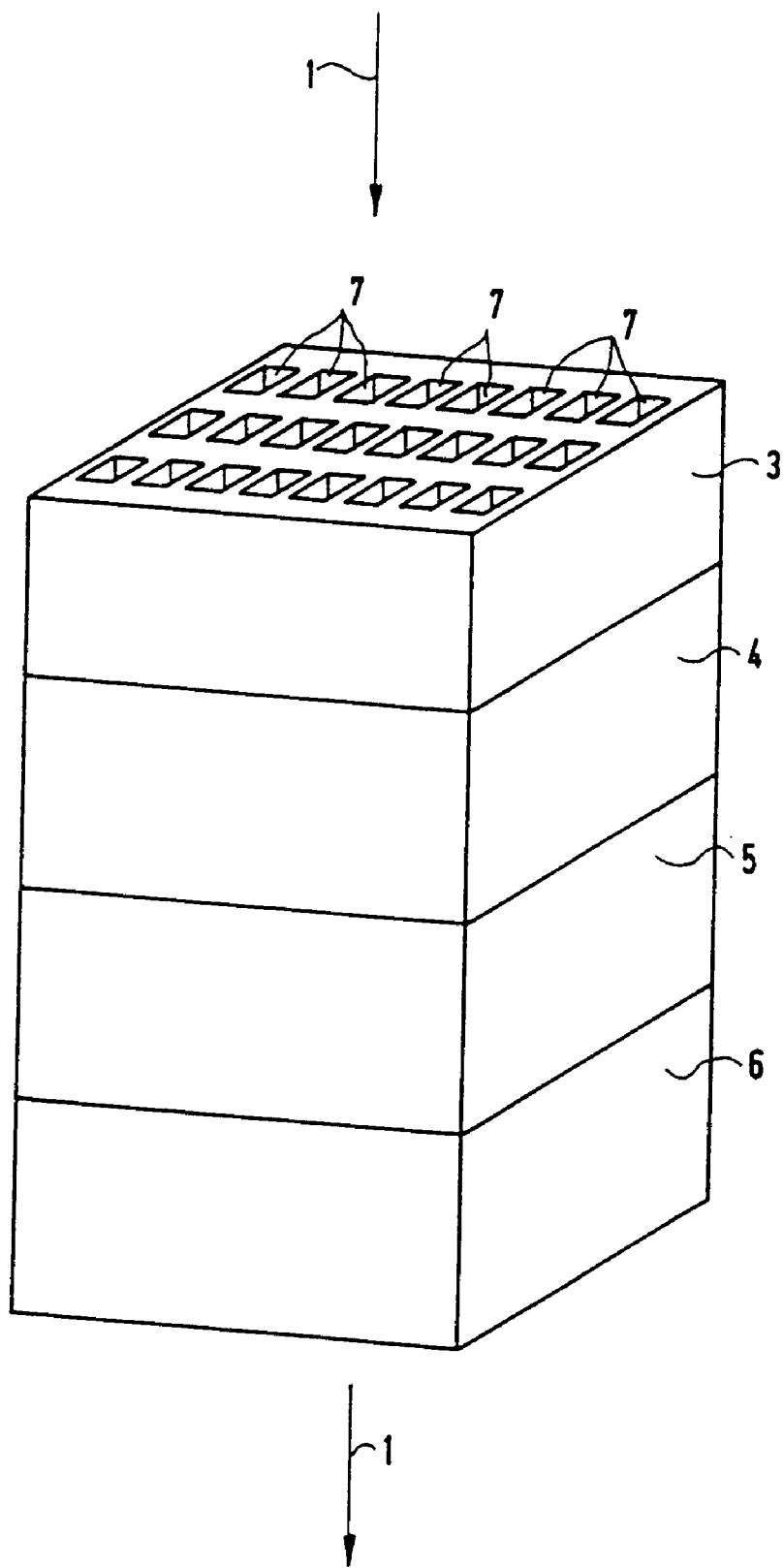
FIG. 3 is a perspective view of a stack of catalytic converters from the configuration for decomposing nitrogen oxides from the gas stream.

FIG. 3 shows an exemplary embodiment of the catalytic converters 3, 4, 5, 6, implemented as solid ceramic extrudates in a stack. The multiplicity of the cells 7, but only for the front most catalytic converter 3, can be seen. The following catalytic converters 4, 5, 6 are constructed accordingly. FIG. 3 also shows that the catalytic converters 3, 4, 5 and 6 need not necessarily be at a distance from one another, but if appropriate can also touch each other. It is conceivable to produce all of the catalytic converters 3, 4, 5 and 6 from a single substrate.

The configuration shown here having a plurality of the catalytic converters 3, 4, 5 and 6 is distinguished by particular flexibility in construction and high effectivity with a compact structure. It is therefore preferably suitable for use in mobile catalytic converter units operating according to the SCR process.

We claim:

1. A configuration for decomposing nitrogen oxides in a gas stream flow, comprising:

a plurality of catalytic converters including a first catalytic converter and a second catalytic converter disposed one behind the other in a flow direction of a gas stream for receiving and conducting said gas stream flow, each of said plurality of catalytic converters having a honeycomb structure with a multiplicity of parallel cells through which the gas stream flows, each of said plurality of catalytic converters also having a predetermined cell density of said parallel cells and a predetermined average level of catalytic activity for decomposing nitrogen oxides defined by a percentage of weight of a catalytically active agent in a respective catalytic converter, said predetermined cell density of said second catalytic converter being lower than said predetermined cell density of said first catalytic converter, and said predetermined average level of catalytic activity of said second catalytic converter being higher than said predetermined average level of catalytic activity of said first catalytic converter.

2. The configuration according to claim 1, wherein one of said plurality of catalytic converter is a front most catalytic converter through which the gas stream is received first and another of said plurality of catalytic converters is a rear most catalytic converter through which the gas stream is received last, said predetermined cell density of said front most catalytic converter is 200 to 400 cells per square inch (cpsi), and said predetermined cell density of said rear most catalytic converter is 10 to 100 cpsi.

3. The configuration according to claim 1, wherein each of said plurality of catalytic converters includes a ceramic material based on at least one of titanium dioxide and tungsten trioxide.

4. The configuration according to claim 3, wherein said catalytically active agent is divanadium pentoxide.

5. The configuration according to claim 4, wherein one of said plurality of catalytic converters is a front most catalytic converter through which the gas stream is received first and another of said plurality of catalytic converters is a rear most catalytic converter through which the gas stream is received last, said predetermined average level of activity of said front most catalytic converter is 0% to 5%, and said predetermined average level of activity of said rear most catalytic converter is 15% to 20%.

6. The configuration according to claim 1, wherein said catalytically active agent is inhomogeneously distributed in said plurality of catalytic converters.

7. The configuration according to claim 1, including an injection unit disposed upstream of said plurality of catalytic converters for injecting a reducing agent into the gas stream flow upstream from said plurality of catalytic converters.

8. The configuration according to claim 7, wherein the reducing agent is urea.

9. A method for decomposing nitrogen oxides in a gas stream flow, which comprises:

placing a plurality of catalytic converters including a first catalytic converter and a second catalytic converter one behind the other in a flow direction of a gag stream, each of the plurality of catalytic converters having a honeycomb structure with a multiplicity of parallel cells, each of the plurality of catalytic converters also having a predetermined cell density of the parallel cells and a predetermined average level of catalytic activity for decomposing nitrogen oxides defined by a percentage of weight of a catalytically active agent in a respective catalytic converter, the predetermined cell density of the second catalytic converter being lower than the predetermined cell density of the first catalytic converter, and the predetermined average level of catalytic activity of the second catalytic converter being higher than the predetermined average level of catalytic activity of the first catalytic converter; and processing the gas stream discharged as exhaust gas from a combustion drive unit through the plurality of catalytic converters for decomposing nitrogen oxides in the gas stream, the gas stream having a temperature fluctuating between about 170° C. and about 500° C.

10. The method according to claim 9, which comprises injecting urea into to the gas stream upstream of the plurality of catalytic converters.

11. The method according to claim 10, which comprises providing the urea as an aqueous solution.

12. The method according to claim 9, which comprises decomposing the nitrogen oxides in the gas stream using a selective catalytic reduction process.

* * * * *